United States Patent [19]

Holland

[11] 4,296,431
[45] Oct. 20, 1981

[54] HIGH-RESOLUTION TELEVISION SYSTEM
[75] Inventor: Kenneth F. Holland, Canyon Country, Calif.
[73] Assignees: Ygnacio Inc., Santa Barbara; Compact Video Systems Inc., Burbank, both of Calif.
[21] Appl. No.: 139,475
[22] Filed: Apr. 11, 1980
[51] Int. Cl.³ ............................................. H04N 9/38
[52] U.S. Cl. ........................................ 358/12; 358/16
[58] Field of Search ...................... 358/12, 14, 15, 16, 358/21 R, 23, 40

[56] References Cited

U.S. PATENT DOCUMENTS

| | | | |
|---|---|---|---|
| 4,117,509 | 9/1978 | de Boer | 358/16 |
| 4,188,638 | 2/1980 | de Haan | 358/15 |
| 4,200,881 | 4/1980 | Carnt | 358/16 |

FOREIGN PATENT DOCUMENTS 1005696 9/1965 United Kingdom .................. 358/16

Primary Examiner—Marc E. Bookbinder
Assistant Examiner—Michael A. Masinick
Attorney, Agent, or Firm—Phillips, Moore, Weissenberger, Lempio & Majestic

[57] ABSTRACT

A high-resolution television system in which color fidelity is preserved while allowing the use of frame-store type noise elimination techniques, by inverting one of the color axes at a first rate, and the other color axis at a second, different rate. While reversal of the second axis at a frame rate is preferred because it permits effective use of noise reduction techniques, reversal at other rates such as the field rate is also beneficial because it allows the filtering of the color subcarrier pattern with less degradation in image quality. In a preferred embodiment of the invention, the color subcarrier frequency is chosen as twice the standard NTSC frequency to reduce horizontal sweep harmonic interference and make the inventive equipment easily compatible with NTSC equipment. Apparatus for achieving such compatibility is described.

17 Claims, 13 Drawing Figures

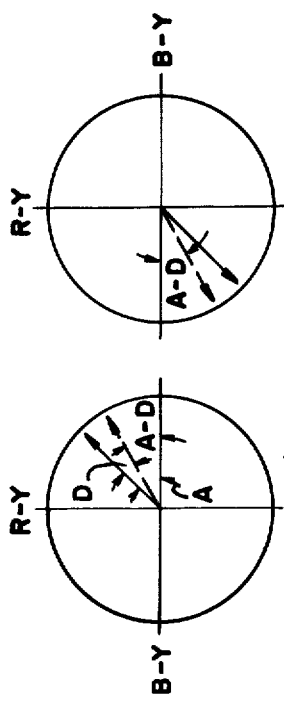
FIG_1a
NTSC
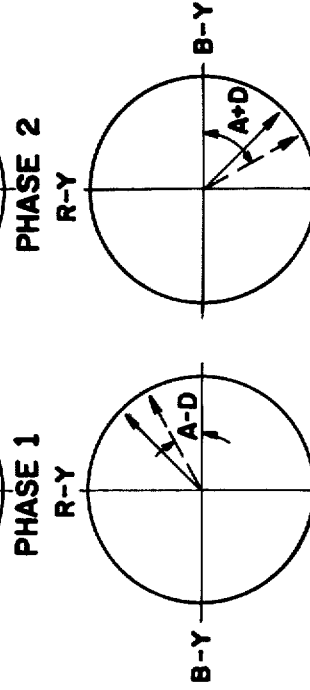
FIG_1b
PAL
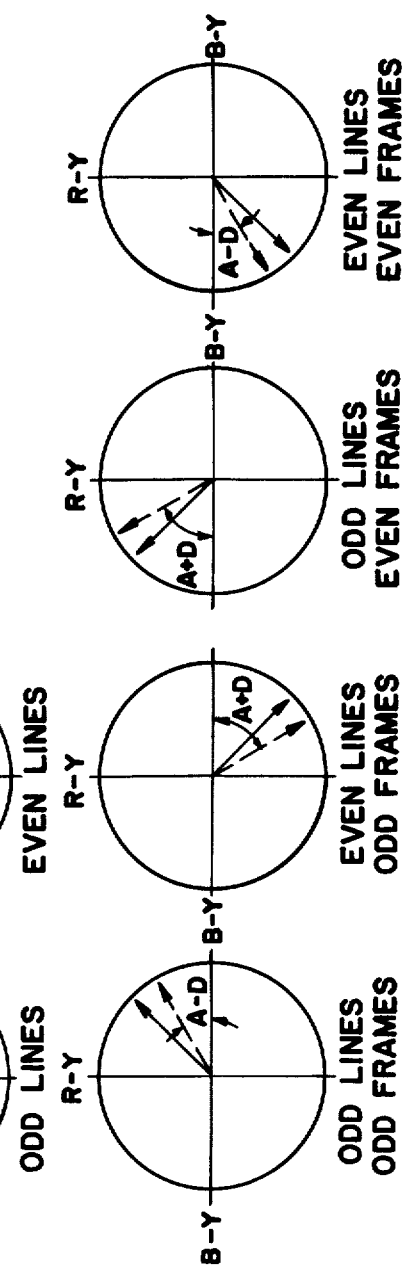
FIG_1c
INVENTIVE SYSTEM

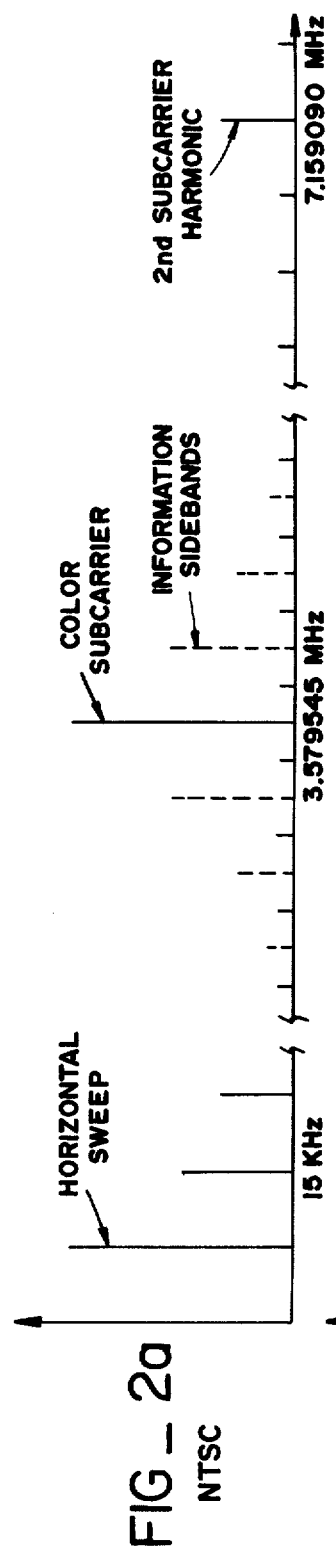
FIG_2a NTSC
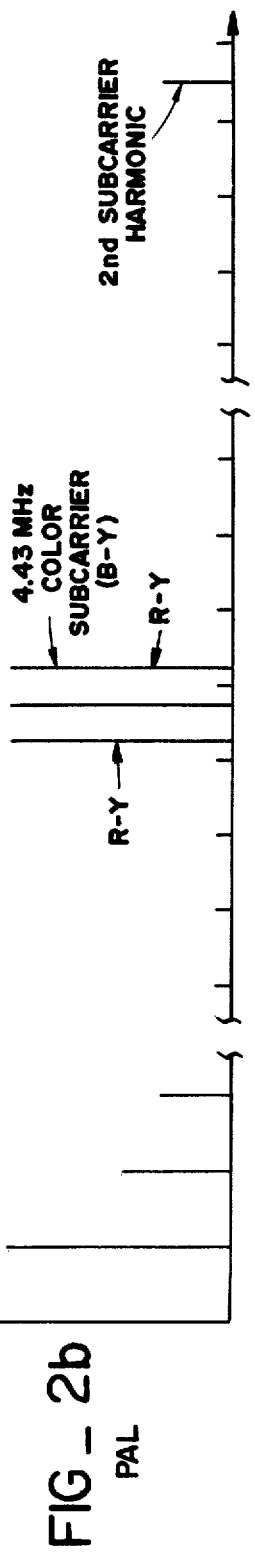
FIG_2b PAL
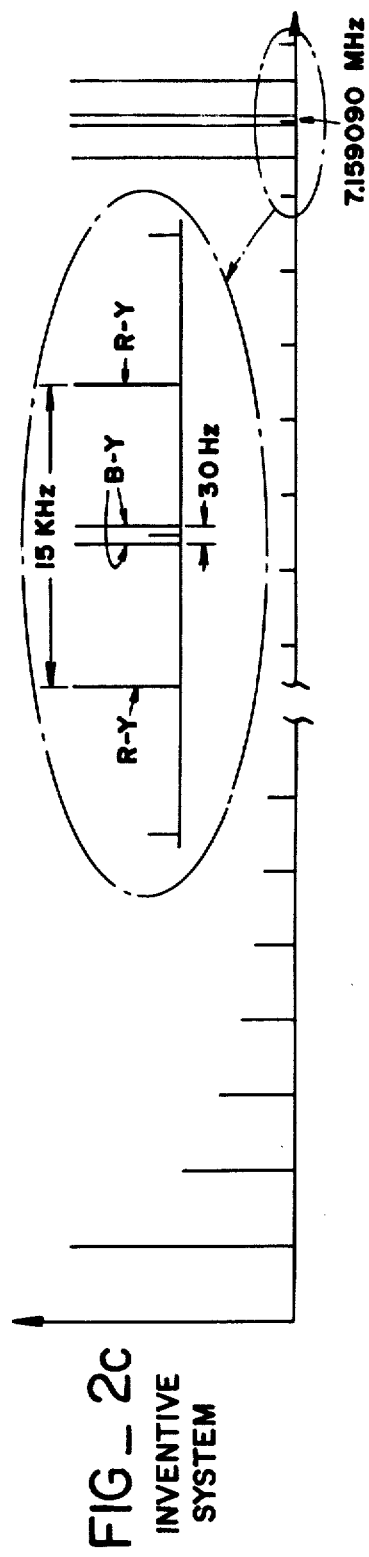
FIG_2c INVENTIVE SYSTEM

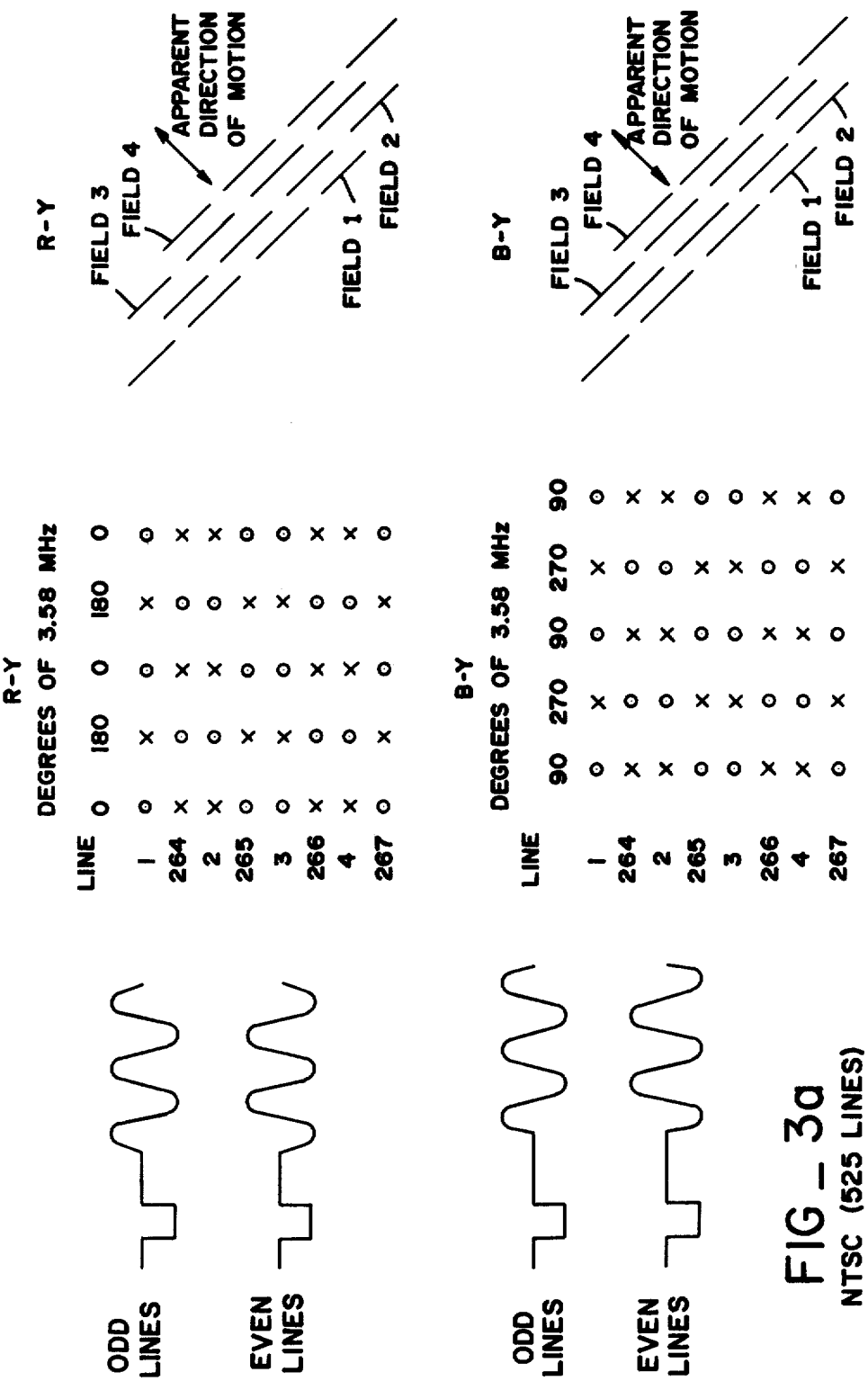
FIG_3a
NTSC (525 LINES)

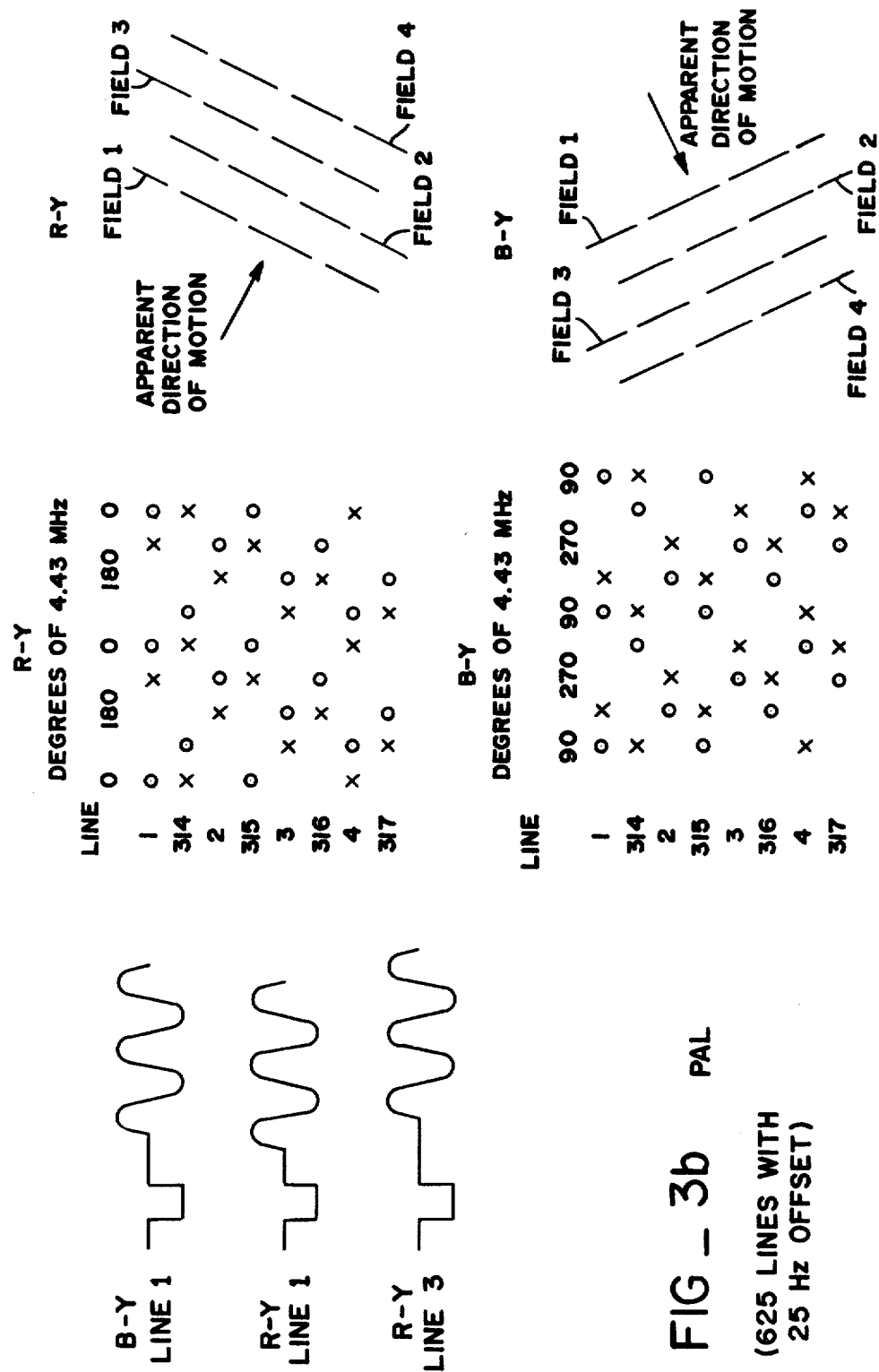
FIG.—3b PAL
(625 LINES WITH 25 Hz OFFSET)

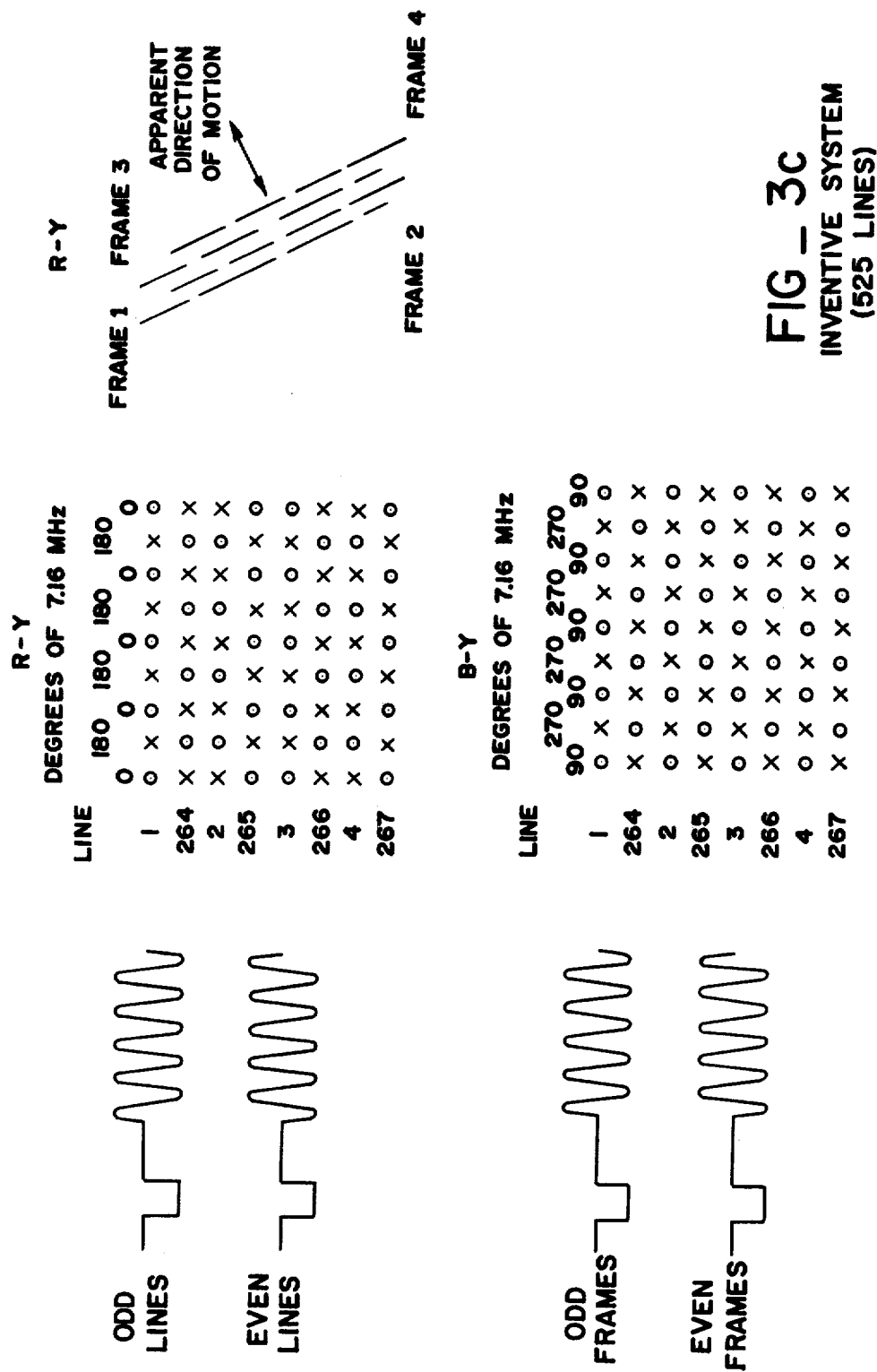
FIG_3c INVENTIVE SYSTEM (525 LINES)

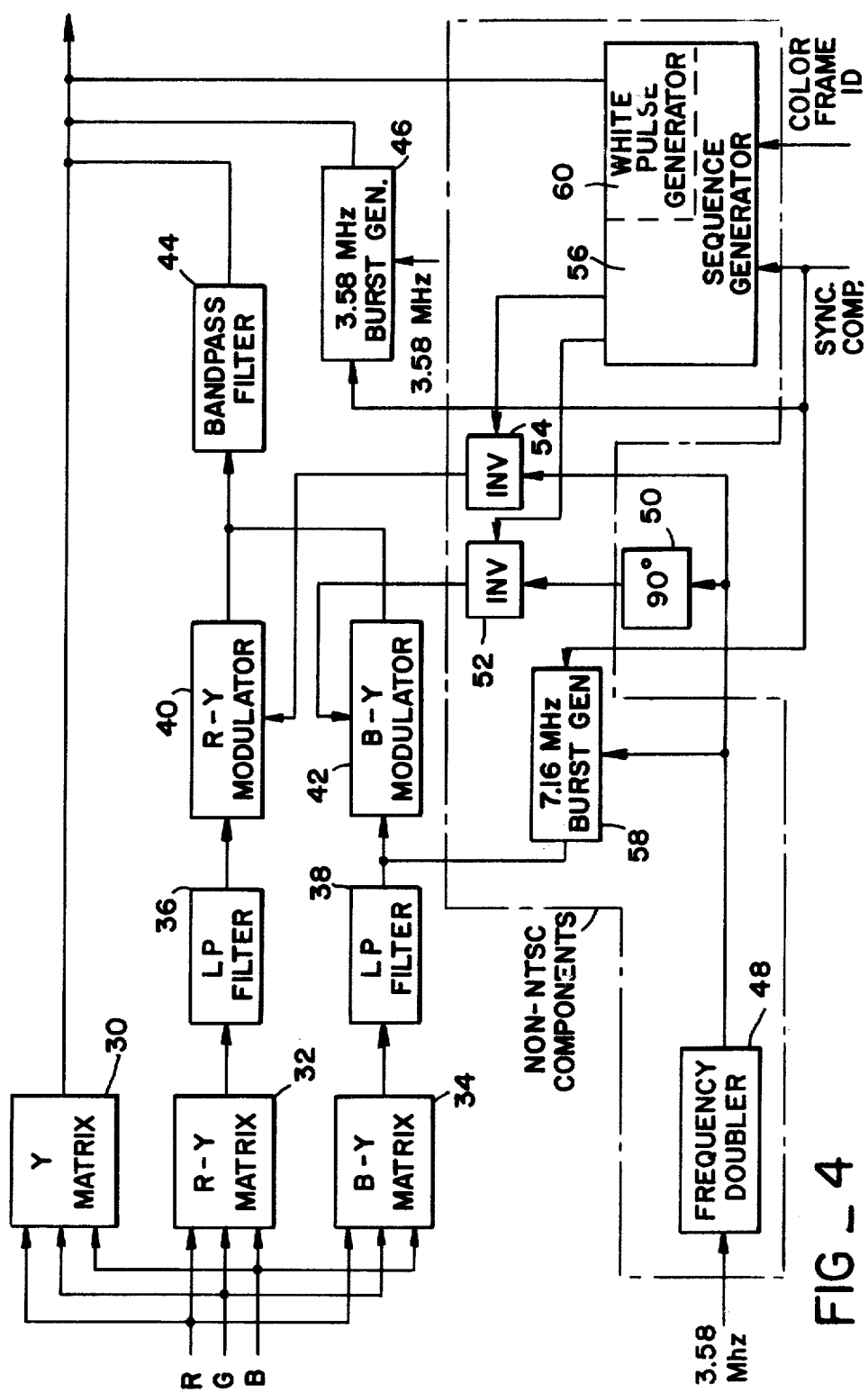
FIG_4

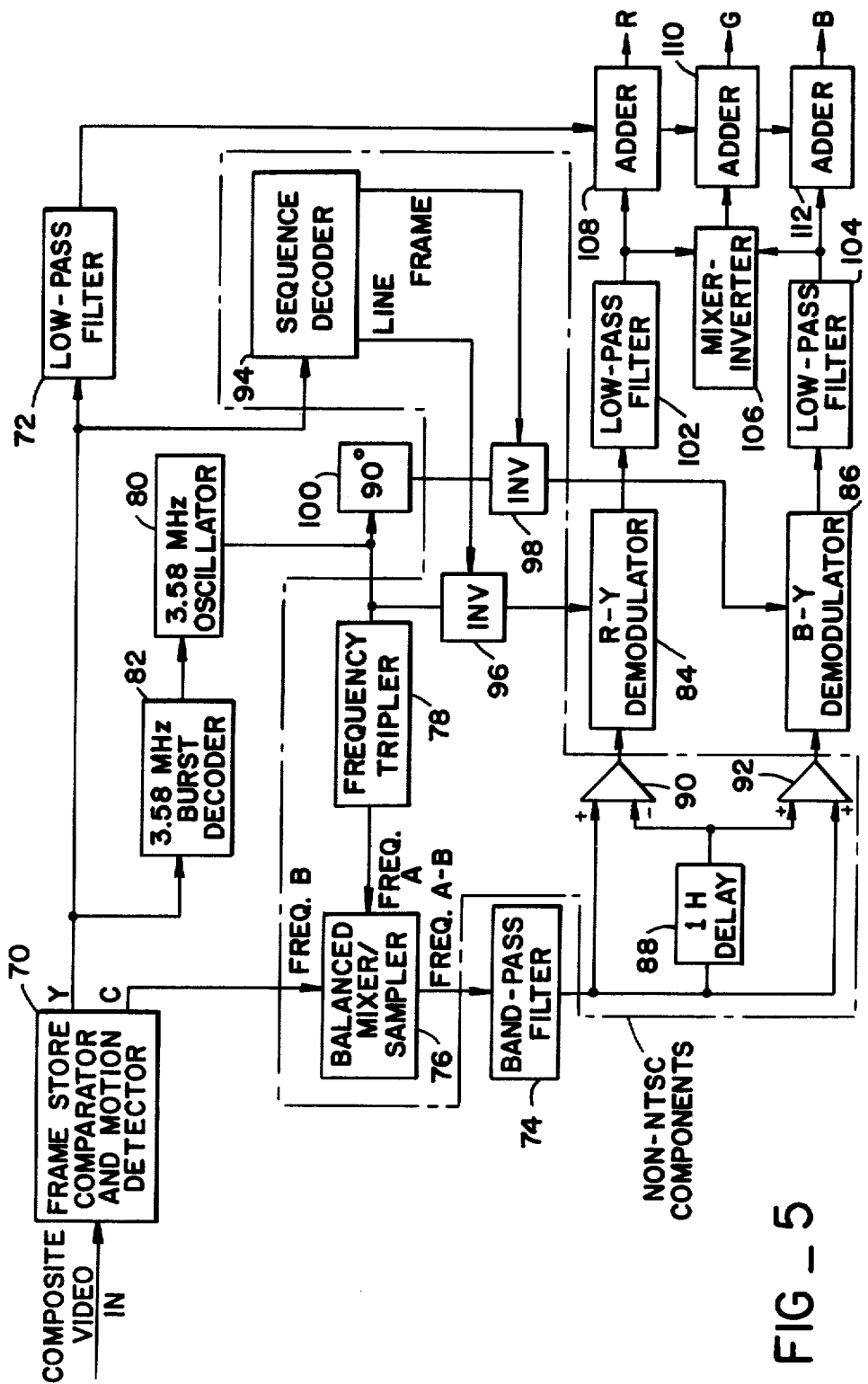
FIG_5

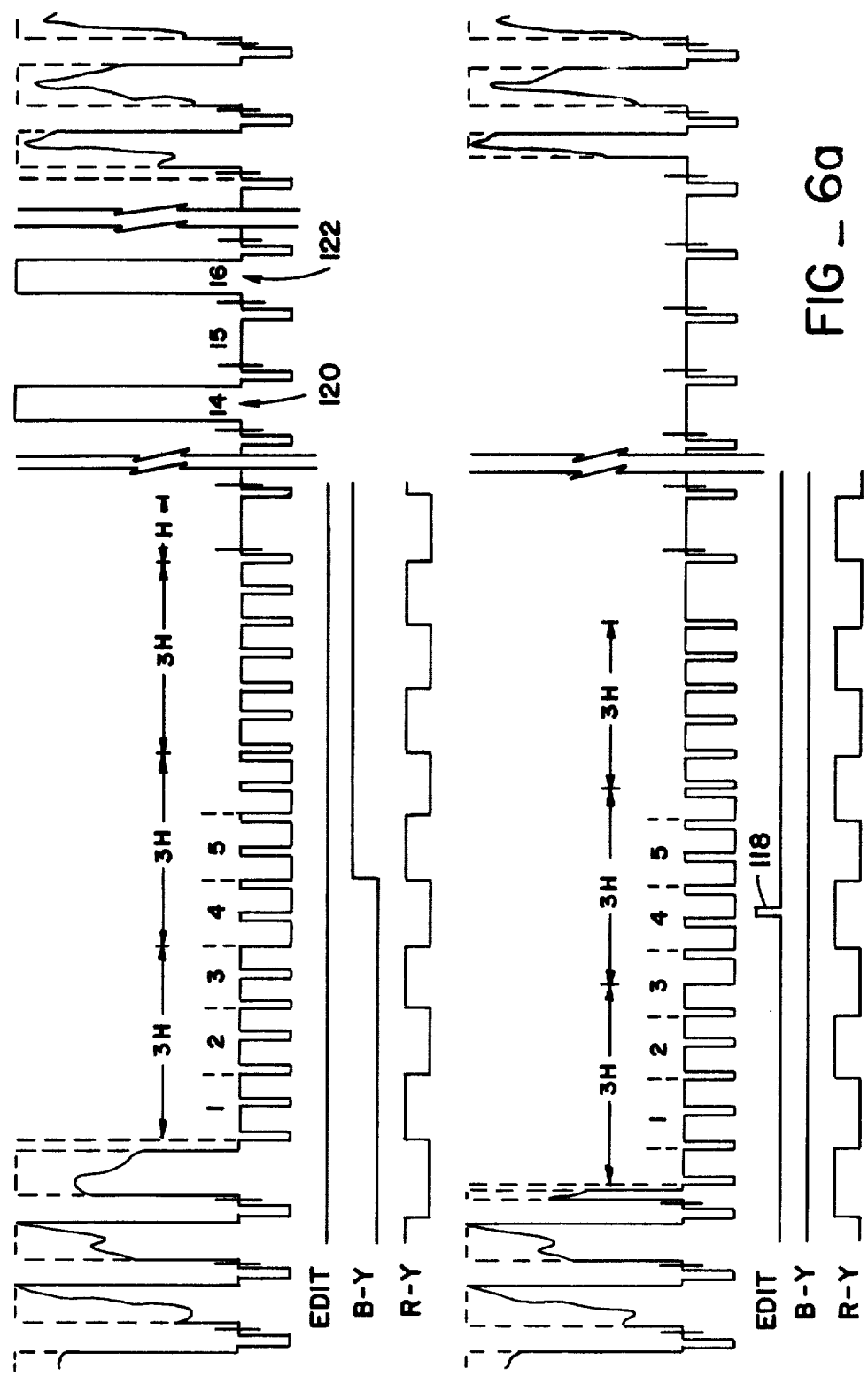
FIG_6a

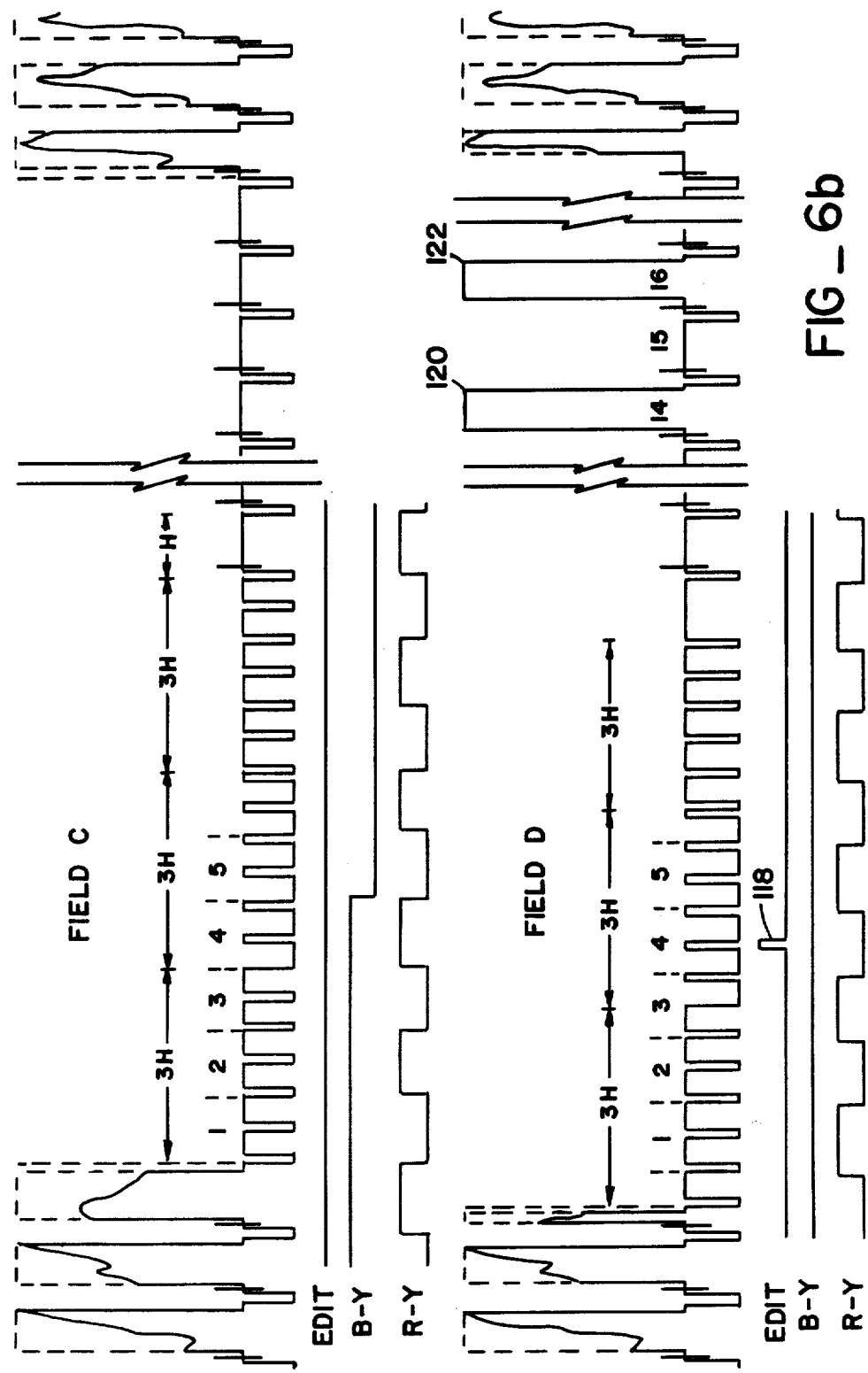

HIGH-RESOLUTION TELEVISION SYSTEM

BACKGROUND OF THE INVENTION

Color television systems use a color subcarrier in the megahertz range which is modulated by a signal representing the color hue. The use of this alternating current subcarrier causes a pattern of bright spots to appear in the video picture, each bright spot corresponding to a peak of the color subcarrier wave. In normal commercial television, this pattern is filtered out, but in the process the sharpness and resolution of the picture are somewhat degraded.

Video images in such specialized applications as video-to-film conversions and large-screen video displays require a resolution which does not normally permit the use of such pattern filters, or at least restricts the breadth and depth of the filter. At the same time, these applications require a very high color fidelity.

Noise reduction and luminance-chroma separation techniques such as those described in U.S. Pat. No. 4,107,736 issued Aug. 15, 1978 and entitled "Noise Reduction System For Video Signals" have been developed to eliminate, among other things, the objectionable pattern without the use of a filter. Noise reduction systems of this type rely on the fact that in the NTSC system of television, the color subcarrier in adjacent frames of the television signal is 180° out of phase. This allows the bright spots caused by the carrier to be cancelled out by an additive process. Inherently, this type of noise reduction system cannot cancel out patterns appearing in the moving portions of the picture. It is therefore desirable to make the pattern as unobtrusive as possible.

The human eye has a psychological tendency to concentrate on vertical and horizontal patterns much more strongly than on patterns lying at an angle. It is therefore desirable to make the pattern as fine as possible, and to make it move at a 45° angle for minimum visual distraction.

The other problem in high-quality specialized television applications as mentioned herein is color fidelity. In the NTSC system, the color hue is quite sensitive to phase distortions. Most transmission media, unfortunately, tend to have somewhat nonlinear phase shift characteristics. Therefore, good hue correction is quite difficult in the NTSC system.

The PAL system achieves much better hue fidelity by reversing one of the color axes at a line rate. This causes phase distortions in adjacent lines to be equal but in opposite directions, so that the integration provided by the human eye produces a visual impression of the correct hue. Unfortunately, this color axis reversal makes it necessary to choose a color subcarrier frequency such that adjacent frames cannot have a 180° phase difference between their color subcarriers. Consequently, equipment using the hue-correction abilities of the PAL system cannot be used with noise reduction equipment of the type described.

SUMMARY OF THE INVENTION

The present invention provides a high-resolution video transmission system which combines the color fidelity of PAL with the filterless noise reduction capability of NTSC. In addition, the system of this invention permits better luminance resolution and has a less objectionable subcarrier pattern than either of the conventional systems.

The invention achieves these improvements by reversing both color axes but at different rates. Typically the R-Y axis may be reversed at a line rate, and the B-Y axis at a frame rate; but other reversal rates can also be used for certain applications.

In accordance with a further aspect of the invention, compatibility of the inventive system with existing NTSC equipment can be achieved at minimal cost by choosing a color subcarrier frequency for the inventive system which is an even harmonic (typically the second harmonic) of the standard NTSC subcarrier frequency.

BRIEF DESCRIPTION OF THE DRAWING

FIGS. 1a, b, and c are vector diagrams illustrating the component signals of the R-Y and B-Y color channels which combine to produce a given hue, in the NTSC system, the PAL system, and the system of this invention, respectively;

FIGS. 2a, b, and c are graphs showing the energy distribution in the transmitted spectrum for the NTSC system, the PAL system, and the system of this invention, respectively;

FIGS. 3a, b and c are composite diagrams illustrating the dot pattern and the causative waveforms for the NTSC system, the PAL system, and the system of this invention, respectively;

FIG. 4 is a block diagram of an encoder for the system of this invention;

FIG. 5 is a block diagram of a decoder for the system of this invention; and

FIGS. 6 and 6b are time-amplitude diagrams illustrating the white-pulse frame synchronization scheme used in the system of this invention.

DETAILED DESCRIPTION OF THE INVENTION

In the standard NTSC and PAL color television systems, color information is encoded in the form of two color signals which are used to modulate, respectively, carrier signals of the same frequency but 90° out of phase with one another. These two modulated carrier signals are then combined into a single color subcarrier which is transmitted as part of the video signal. At the receiving end, the color subcarrier is demodulated to retrieve the two color signals, known as the R-Y and B-Y signals. Color can be expressed in terms of a vector whose angle from a reference axis determines the hue, and whose magnitude determines brightness. This color vector is the vectorial sum of the R-Y and B-Y signals plotted at right angles to one another.

Because of the fact that the color signals are transmitted on an alternating current subcarrier, a carrier pattern of alternating bright and dark spots is generated in color television pictures. In normal commercial television, this pattern is filtered out, but the filtering of the pattern also removes some picture information. In applications requiring very high picture quality it is not practical to use such filtering, and other methods had to be developed to cancel out the carrier pattern (as well as other noise components) at least in the stationary portions of the picture. A typical such technique is described in U.S. Pat. No. 4,107,7736 issued Aug. 15, 1978 and entitled Noise Reduction System For technique is most effective when the VIDEO SIGNALS. This technique is most effective when the color subcarriers of successive frames of the television picture are of opposite phase.

Most transmission media used in the television art produce a certain amount of phase shift in the transmitted television signal. In most instances, this phase shift is non-linear with respect to signal amplitude. Inasmuch as a phase shift in the transmission medium causes a change in the angle between the color vector and its reference axis, this transmission medium phase shift results in non-linear hue distortions which are very difficult to correct in the NTSC system.

The PAL system overcomes this hue distortion problem by reversing, in every other line of the picture, the phase of the carrier signal which is modulated by the R-Y color signal. As shown in FIG. 1b, this causes any hue distortion introduced by the transmission medium to lie in opposite directions in successive lines of the picture. A line comparison circuit (elements 88, 90, 92 in FIG. 5) integrates these opposite distortions so as to produce the true hue.

Alternation of the R-Y axis in the PAL system produces sidebands at one-half the horizontal sweep frequency on each side of the color subcarrier. The color subcarrier (for reasons discussed hereinafter) must therefore have a frequency which makes it impossible for the color subcarriers in adjacent frames of the video picture to be 180° out of phase. Consequently, the PAL system cannot effectively be used with the pattern-eliminating technique of U.S. Pat. No. 4,107,736.

In accordance with the invention, the two carrier signals which are modulated by the R-Y and B-Y signals, respectively, are both inverted though at different rates. Typically, one carrier signal (usually the R-Y channel) may be inverted from line to line while the other is inverted from frame to frame or from field to field. Reversal at a frame rate makes it possible to use the highly advantageous techniques of U.S. Pat. No. 4,107,736. A field-rate reversal, though precluding the use of filterless noise reduction, still produces a much less visually objectionable subcarrier pattern than the NTSC or PAL systems do. This allows the use of narrower and shallower filters which are less detrimental to picture quality than the filters required by the current standard system. Reversal of the two color axes at the same rate is not possible because the reversal of the second axis would then cancel out the hue-correcting effect of the reversal of the first axis.

FIGS. 3a, b and c illustrate, on the left, the relative phases of the R-Y and B-Y carrier signals in the three systems under consideration. The central part of each of these figures illustrates the respective positions of the bright spots in the picture during one frame (circles) and during the next frame (crosses). The right side of these three figures illustrates the visual appearance of the respective patterns when bright spots lying vertically or nearly vertically below each other are integrated by the human eye.

It will be noted in FIG. 3c that the pattern produced by the system of this invention the R-Y channel (which is considerably more dominant in most natural colors than the B-Y channel) is broken up much more finely than the patterns of both the NTSC or the PAL systems. This is important for two reasons: for one, the pattern eliminating techniques of U.S. Pat. No. 4,107,736 are unable to cancel out the pattern in the moving portions of the image, and a finely broken-up pattern is much less readily visible in a moving environment; and secondly, the type of pattern produced by the system of this invention in the R-Y channel is so different from the type of pattern in the B-Y channel that the separation of the two color signals becomes much easier. Because of its omnidirectional symmetry, the B-Y pattern of FIG. 3c appears to the viewer to have no coherent movement or "marquee effect".

Referring now to FIGS. 2a, b and c, it will be seen that the reversal of both color axes introduces new criteria for the choice of the color carrier frequency. As will be apparent from the enlarged detail on the right side of FIG. 2c, the alternation of both color axes produces two pairs of side bands, one lying approximately 7.8 kHz on each side of the color subcarrier frequency and the other lying 15 Hz on each side of the color subcarrier frequency. The color subcarrier itself is eliminated by this double reversal. In order to prevent objectionable visible interference between the sweep circuits and the color signal, it is necessary that no color-related frequency be coincident with any harmonic of the horizontal sweep frequency. For this reason, the color carrier frequency of the NTSC system (which has no reversal-generated side bands) is chosen to lie exactly half-way between two harmonics of the horizontal sweep frequency. Inasmuch as in the system of this invention, there is no energy at the color subcarrier frequency, and inasmuch as it is desirable that the color subcarrier sidebands be symmetrical with respect to a horizontal sweep frequency harmonic, it follows that the color subcarrier frequency in the system of this invention must be equal to a harmonic of the horizontal sweep frequency.

It will be noted that, inasmuch as the standard color subcarrier frequency of the NTSC system lies exactly half-way between two horizontal sweep frequency harmonics, every even harmonic of the standard NTSC color subcarrier frequency will coincide with a horizontal sweep frequency harmonic. This property of the system of this invention makes possible a very interesting further feature of the present invention. By choosing a color subcarrier frequency of 7.159090 MHz (the second harmonic of the standard NTSC subcarrier), it becomes possible to make equipment designed for the system of the present invention easily compatible with existing NTSC-type equipment by the addition of only a few circuits. The details of this compatibility will now be discussed in connection with FIGS. 4 and 5.

FIG. 4 shows an encoder suitable for use with a system of this invention. In a standard NTSC encoder, the primary color signals R, G and B put out by the color camera are matrixed by the matrices 30, 32 and 34, respectively, into Y, R-Y and B-Y signals, where Y is the luminance signal and R-Y and B-Y are the color signals.

After going through low-pass filters 36 and 38, respectively, the R-Y and B-Y signals are applied respectively, to modulators 40, 42 where they are used to modulate, in the NTSC system, two 3.58 MHz carrier signals which are 90° out of phase with one another. The resulting modulated carrier signals are then combined with each other, filtered through a band pass filter 44, and finally combined with the Y signal from matrix 30 for transmission. Color synchronization is provided in the NTSC system by a 3.58 MHz burst generated at a predetermined point in the horizontal retrace portion of each line by burst generator 46.

To convert the typical NTSC encoder described above for use in the system of this invention, it is merely necessary to pass the incoming 3.58 MHz color subcarrier frequency generated by the conventional equipment through a frequency multiplier 48 which, in the preferred version of the system, doubles the standard color subcarrier frequency. The resulting carrier signal is then applied to the B-Y modulator 42 though a 90° phase shift circuit 50 which is also present in conventional NTSC equipment.

In accordance with the invention, both the output of phase shift circuit 50 and the output of carrier multiplier 48 are applied to the respective modulators 42, 40 through switchable inverters 52, 54. The inverter 52 is switched at a frame or field rate by the sequence generator 56, while the inverter 54 is switched on and off at a line rate by the same sequence generator 56.

In the system of the invention, the additional synchronization necessary for the timing of the inverter sequences at the receiving end is provided by a second synchronizing burst at the doubled color subcarrier frequency immediately following the burst produced by generator 46. This second burst is produced by a burst generator 58. An additional advantage of this second synchronizing burst is that it gives the equipment's equalizing circuitry a third reference point (the others are at 15 Hz and at 3.58 MHz) which enables the equalizing circuitry to determine a truer frequency equalization curve.

The sequence generator 56 may also contain a white pulse generator 60 for a purpose hereinafter described in connection with FIG. 6.

FIG. 5 is a block diagram of a decoder suitable for use in the system of this invention. A frame store delay comparator and motion detector 70 constructed in accordance with the teachings of U.S. Pat. No. 4,107,736 produces a luminance output Y and a color output C. For the moving portions of the picture, a low-pass filter 72 is provided in the luminance channel. This filter has a cut-off frequency of 6 MHz in conventional NTSC equipment, but when the equipment is used in connection with the system of this invention, the filter 72 should be modified to increase its cut-off frequency to 8 MHz.

The color channel output C of the frame store 70 is applied, in conventional NTSC equipment, to a band-pass filter 74 whose pass band is 2.5 to 5.0 MHz. In accordance with the invention, a balanced mixer or sampler 76 is interposed in the color channel between the frame store 70 and the band-pass filter 74. The mixer 76 mixes the incoming color subcarrier (whose frequency is twice the frequency of the NTSC color subcarrier) with a signal having three times the NTSC color subcarrier frequency. This latter signal is produced by a multiplier 78 from the conventional 3.59 MHz oscillator 80 driven by the conventional first-burst decoder 82. The output of mixer 76 is a modulated color subcarrier at the standard NTSC frequency, which can be applied to band-pass filter 74 in the usual manner.

Television equipment used in conjunction with videotape recorders commonly includes digital time base correctors (not shown) located in the input path of the composite video signal incoming to the decoder of FIG. 5. These devices, whose function it is to compensate for tape speed fluctuations, sample the composite video signal, convert the samples to digital form, compute the necessary time-base corrections, and then produce a corrected analog video signal through a low-pass filter with a 6 MHz cutoff.

The mathematical relations in the sampling of the signal by a conventional time base corrector are inherently such that a color subcarrier of twice the NTSC subcarrier frequency is reproduced at the output of the time-base corrector as a subcarrier of NTSC frequency. Consequently, frequency-difference circuits such as the mixer or sampler 76 are not needed when a digital time base corrector is present in the equipment.

The output of band-pass filter 74 is applied in a conventional manner to R-Y demodulator 84 and B-Y demodulator 86. The demodulators 84, 86 may be made phase-insensitive (e.g. insensitive to drift in the 3.58 MHz oscillator 80) by providing a one-line delay circuit 88 (conventionally used in PAL equipment) whose output is subtractively combined with the band-pass filter output in adder 90, and additively combined with the output of band-pass filter 74 in adder 92.

In accordance with the invention, a sequence decoder 94 is driven by the synchronizing signals contained in the luminance channel Y operates inverters 96, 98 in accordance with the switching scheme described above in connection with FIG. 4. A 90° phase shift circuit 100 is conventionally provided to produce the vectorial orthogonality of the R-Y and B-Y signals.

The R-Y and B-Y signals produced by the demodulators 84, 86 are conventionally passed, respectively, through 1.6 MHz low-pass filters 102 and 104. They are then mixed and inverted in the mixer-inverter 106, and are conventionally transformed into the R, G and B color gun bias signals, with the help of the Y signals, in the adders 108, 110 and 112 of the reverse matrix 114.

FIG. 6 illustrates a scheme by which timing information necessary for the proper sequencing of the color axis inversions can be accomplished. In videotape-to-film transfer applications, each film frame starts at an edit pulse 118 of FIG. 6. In order to produce the optimum subcarrier pattern when recording on film, the reversal of the B-Y axis should take place at the beginning of fields A and C of any given adjacent pair of frames, i.e. in the middle of each film frame. It is therefore necessary for the circuit to know which field of the frame is being traced at any given time. This is preferably accomplished in the system of the invention by adding two white pulses 120, 122 to lines 14 and 16 of fields A and D. These white pulses are produced in the encoder of FIG. 4 by the white pulse generator 60. They are detected in the decoder of FIG. 5 by the sequence decoder 94, which can readily detect their presence because lines 14 and 16 are within the vertical retrace area of the picture and are therefore normally black.

Upon detection of the white pulses 120 and 122, a timing circuit (not shown) in sequence decoder 94 is started. This timing circuit produces an inversion of the B-Y axis during the appropriate vertical synchronization intervals as shown in FIG. 6.

I claim:

1. A method for conveying color information in a television system, comprising the steps of:
    (a) producing first and second color signals together containing said color information;
    (b) using each of said color signals to separately modulate a carrier signal;
    (c) reversing the phase of said carrier signal modulated by said first color signal at a first rate;
    (d) reversing the phase of said carrier signal modulated by said second color signal at a second rate different from said first rate;
    (e) combining said modulated carrier signals into a single modulated color subcarrier;

(f) transmitting said color subcarrier;

(g) demodulating said subcarrier upon receipt to obtain said first and second color signals.

2. The method of claim 1, in which said first rate is once per line, and said second rate is once per frame.

3. The method of claim 1, in which said first rate is once per line, and said second rate is once per field.

4. The method of claim 1, in which the frequency of carrier signal is an even harmonic of a standard color subcarrier frequency.

5. The method of claim 1, in which the frequency of said carrier signal is on the order of 7.159090 MHz.

6. The method of claim 1, in which said first and second color signals are R-Y and B-Y signals.

7. In a color video encoder having means for producing a pair of color signals representative of hue, modulating with said signals a pair of carriers of like frequency but displaced in phase from one another by 90°, and combining said carriers to form a color subcarrier, the improvement comprising:

(a) inverter means operatively connected to each of said modulating means to periodically invert the phase of the carrier being modulated thereby; and (b) sequencing means arranged to switch said inverter means so as to invert the phase of one of said carriers at a first rate, and the phase of the other carrier at a second, different rate.

8. The improvement of claim 7, in which said first rate is the line rate, and said second rate is the frame rate.

9. The improvement of claim 8, further comprising means for producing white pulses in selected lines of selected fields of the video image to provide a synchronization signal for the inversion of said second axis.

10. The improvement of claim 7, in which said first rate is the line rate, and said second rate is the field rate.

11. The improvement of claim 7, in which the frequency of said carriers is 7.159090 MHz.

12. In the encoder of claim 7, in which said encoder has oscillator means for producing said carriers at the standard NTSC frequency, the further improvement comprising fequency doubler means connected to said oscillator means for doubling the frequency of said carriers.

13. The improvement of claim 12, further comprising means for generating and transmitting a synchronization burst as said doubled frequency following the transmission of the standard NTSC color synchronization burst.

14. In a color video decoder having means for decoding a color subcarrier signal by separately demodulating said subcarrier signal with a pair of carriers of like frequency but displaced from each other in phase by 90° to produce a pair of color signals representative of hue, the improvement comprising:

(a) inverter means operativley connected to each of said demodulating means to periodically invert the phase of the carrier being applied thereto;

(b) sequencing means arranged to switch said inverter means so as to invert the phase of one of said carriers at a first rate, and the phase of the other carrier at a second, different rate.

15. The improvement of claim 14, in which said first rate is the line rate, and said second rate is the frame rate.

16. The improvement of claim 14, in which said first rate is the line rate, and said second rate is the field rate.

17. In the decoder of claim 14, in which said decoder has oscillator means for generating said carriers at the standard NTSC frequency, the further improvement comprising:

(a) frequency tripler means connected to said oscillator for producing a signal having three times the standard NTSC color subcarrier frequency; and (b) frequency-difference means operatively connected to the incoming modulated color subcarrier signal and to said frequency tripler means and arranged to produce a modulated color subcarrier signal having a frequency equal to three times the standard NTSC color subcarrier frequency less the frequency of said incoming color subcarrier.

* * * * *